US011731157B2

(12) United States Patent
Pfanstiel et al.

(10) Patent No.: US 11,731,157 B2
(45) Date of Patent: Aug. 22, 2023

(54) DRUM COATER DEVICE FOR COATING TABLETS

(71) Applicant: Hüttlin GmbH, Schopfheim (DE)

(72) Inventors: Christopher Pfanstiel, Rheinfelden (DE); Ian Warr, Lörrach (DE); Norbert Zerrer, Schopfheim (DE)

(73) Assignee: Hüttlin GmbH, Schopfheim (DE)

( * ) Notice: Subject to any disclaimer, the term of this patent is extended or adjusted under 35 U.S.C. 154(b) by 0 days.

(21) Appl. No.: 17/843,230

(22) Filed: Jun. 17, 2022

(65) Prior Publication Data
US 2022/0401988 A1 Dec. 22, 2022

(30) Foreign Application Priority Data
Jun. 18, 2021 (DE) ...................... 10 2021 115 831.1

(51) Int. Cl.
*B05C 3/08* (2006.01)
*B05C 3/09* (2006.01)
(Continued)

(52) U.S. Cl.
CPC ............... *B05C 3/08* (2013.01); *A23G 3/26* (2013.01); *A61J 3/005* (2013.01); *B01J 2/006* (2013.01); *B01J 2/12* (2013.01); *B05C 3/09* (2013.01)

(58) Field of Classification Search
CPC ....... A23G 3/26; B01J 2/14; B01J 2/12; B01J 2/006; A61J 3/00; A61J 3/005;
(Continued)

(56) References Cited

U.S. PATENT DOCUMENTS

2008/0264333 A1   10/2008  Gandolfi et al.
2008/0286439 A1*  11/2008  Liu ........................ A23G 3/26
                                                          118/19

FOREIGN PATENT DOCUMENTS

JP        H07328408 A    12/1995
WO    2006109173 A2    10/2006
(Continued)

OTHER PUBLICATIONS

European Patent Office Search Report for Related Application No. 22173721.6 dated Oct. 31, 2022 (12 pages, including a partial English translation).

(Continued)

*Primary Examiner* — Laura Edwards
(74) *Attorney, Agent, or Firm* — Michael Best & Friedrich LLP (57) ABSTRACT

A drum coater device (10) for coating tablets, comprising a mixing drum (18) which can be rotated about an axis of rotation (20) and which has an interior (24) for arranging a tablet batch to be coated, further comprising a spraying device for introducing a coating material into the interior, wherein the mixing drum has a hollow-cylindrical, perforated wall which delimits at least part of the interior of the mixing drum, wherein mixing elements for mixing the tablets of a tablet batch are arranged on the inner side, which faces the interior, of the wall, wherein pairs (36) of mixing elements (34*a*, 34*b*) form legs which are oriented with respect to one another in a V shape, wherein the distance between the legs of a pair widens from a central annular region, as seen along the axis of rotation, of the wall in the direction of lateral annular regions adjacent to the central annular region.

10 Claims, 6 Drawing Sheets

(51) Int. Cl.
  *A23G 3/26* (2006.01)
  *A61J 3/00* (2006.01)
  *B01J 2/00* (2006.01)
  *B01J 2/12* (2006.01)

(58) Field of Classification Search
  CPC . F26B 11/02; F26B 11/04; B05C 3/08; B05C 3/09; B05B 13/0257
  USPC .......................................... 118/19, 417, 418
  See application file for complete search history.

(56) References Cited

FOREIGN PATENT DOCUMENTS

| WO | 2007078876 A1 | 7/2007 |
| WO | 2011013537 A1 | 2/2011 |

OTHER PUBLICATIONS

German Patent Office Action for Application No. 102021115831.1 dated Mar. 17, 2022 (6 pages including machine translation).

\* cited by examiner

DRUM COATER DEVICE FOR COATING TABLETS

BACKGROUND

The invention relates to a drum coater device for coating tablets, comprising a mixing drum which can be rotated about an axis of rotation and which has an interior for arranging a tablet batch to be coated, further comprising a spraying device for introducing a coating material into the interior, wherein the mixing drum has a hollow-cylindrical, perforated wall which delimits at least part of the interior of the mixing drum, wherein mixing elements for mixing the tablets of a tablet batch are arranged on the inner side, which faces the interior, of the wall, in accordance with WO 2006/109173 A2.

A drum coater device, or for short a drum coater (also known as a pan coater), or tablet coater serves for homogeneously mixing tablets within a rotating, hollow-cylindrical wall. Such a wall is usually delimited at its sides by frustoconical boundary surfaces, with one of the boundary surfaces being open in a central region in order to allow access to the interior of the mixing drum.

During a mixing operation, the mixing drum rotates, with the tablets of a tablet batch rolling on the inner side of the wall of the mixing drum, it being the case that a tablet bed is established which has a tablet level inclined with respect to a horizontal.

A spraying zone is usually situated below the highest level of such a tablet bed, in which spraying zone a spraying device sprays a coating material onto the tablets. The coating material is, for example, a gas-solid mixture, in particular a lacquer or an active substance.

The wall of the mixing drum is perforated so that dry air can be fed in from outside and introduced into the interior of the mixing drum for the purpose of drying the coating material sprayed onto the tablets of a tablet batch.

There is thus gradually formed a continuous surface layer which, for example, makes it possible to mask the taste of active substances, makes it easier to take the tablets or provides a sugar coating or a so-called enteric coating (targeted release of active substances).

All the tablets of a tablet batch can ideally be provided with a mutually identical coating. This requires careful coordination of the spraying and drying operations and in particular homogeneous mixing of all the tablets of a tablet batch.

To allow mixing of all the tablets of a tablet batch in as uniform a manner as possible, mixing elements are provided which are arranged as blades, drivers or barriers on the inner side of the wall of the mixing drum, and possibly also on the inner sides of the boundary surfaces. These mixing elements set the tablet bed in movement over and over again.

However, the problem exists that the mixing elements are usually designed for a quite specific size of a tablet batch. If the mixing elements for a large tablet batch are too low, only inadequate mixing takes place. If the mixing elements for a small tablet batch are too high, they project beyond the level of a tablet bed and temporarily receive coating material that may, however, become detached, with the result that the coating quality suffers.

SUMMARY

Taking this as a starting point, the object on which the present invention is based is that of specifying a drum coater device which is suitable for tablet batches of different sizes.

In the case of a drum coater device of the type stated at the outset, this object is characterized in that pairs of mixing elements form legs which are oriented with respect to one another in a V shape, wherein the distance between the legs of a pair widens from a central annular region, as seen along the axis of rotation, of the wall in the direction of lateral annular regions adjacent to the central annular region.

The legs, which are oriented in a V shape, of a pair of drivers form a funnel region on the wall of the mixing drum and in the central annular region, in which funnel region the tablets arranged further below in a tablet bed collect and in this way increase the tablet level in this region in the form of an accumulation. When this accumulation is caused to be transported further by rotation of the mixing drum, it has a tendency—due to the force of gravity—of flattening off again. As a result, the upper tablets of the tablet bed are transported in the direction of the lateral annular regions. From there, the tablets (that is to say in principle on the "rear side"—as seen in the running direction of the circumference of the inner side—of a first pair of legs oriented in a V shape and on the "front side" of a second pair of legs oriented in a V shape that follows the first pair in the running direction) pass again into the central annular region and thereby sink into the lower region of the tablet bed.

This gives rise, on both sides of a central annular plane, to two spiral tablet transport paths which produce mixing of the tablets both from bottom to top and back and from inside to outside and back. In addition, an exchange of tablets of different tablet transport paths occurs in the central annular region. This mixing principle ensures not only particularly homogeneous mixing of the tablets, but functions in particular also with tablet batches of different sizes.

The ends, which are arranged in the central annular region, of the legs of at least one pair (that is to say those ends of the legs of a pair which have the smallest distance from one another) are preferably spaced apart from one another. In the region of this spacing there is created an open corridor for the tablet flow that prevents the lower tablets of the tablet bed from being prematurely transported out of this region. Such transport of the tablets would thus involve tablets overcoming an upper mixing edge of a mixing element before these tablets reach the upper part of the spiral transport path.

The aforementioned spacing apart of the ends of the legs has the further advantage that an inherent mechanical abrasion between the tablets can be reduced to a minimum. This contributes to gentle and efficient coating of the tablets.

It is also preferred if a leg or both legs of at least one pair is or are fragmented and, as seen along a leg axis, has or have at least two mixing elements which are spaced apart from one another. In the region of a spacing between two mixing elements of the same leg, tablets can thus come into contact with the wall of the mixing drum. This results, as seen in the circumferential direction of the wall, in additional mixing paths, also with exchange of tablets of the above-explained spiral transport paths.

It is also preferred if the mixing elements or a subset of mixing elements of at least one pair each have a mixing edge which faces the axis of rotation and which is inclined relative to the wall. In this way, the height of a mixing element varies along the profile of a mixing element, with the result that—with respect to an imaginary, horizontal tablet level—quantities of tablets can be carried along over different heights on the wall of the mixing drum and be set in movement.

In particular, the mixing edge—as seen from the central annular region in the direction of a lateral annular region— has, along its extent, an increasingly greater distance from the wall. This means that, in the central annular region or in a portion of the mixing edge that faces the central annular region, the mixing edge has a smaller distance from the wall of the mixing drum than in a lateral annular region or in a portion of the mixing edge that faces a lateral annular region. As a result, the above-explained accumulation of tablets in the central annular region is supported.

It is possible that a fraction of at least 10% and/or at most 75% of the circumference of the inner side of the wall is covered by mixing elements. However, the fraction of the coverage can also be up to 100%.

It is also preferred if the mixing elements have a setting angle relative to the inner side of the wall that is between 60° and 90°. With a setting angle of 90°, the mixing elements thus extend perpendicular to the inner side of the wall; by choosing a different setting angle, the profiles of the tablet transport paths can be influenced.

It is also preferred if the mixing elements have a height which is between 1% and 30% of the inside diameter of the wall. These values allow the reliable formation of at least two spiral tablet transport paths.

With respect to an axis parallel to the axis of rotation, the mixing elements are preferably arranged so as to be inclined by an angle which is between 15° and 60°. These values allow tablet batches of different sizes to be homogeneously mixed.

Finally, it is preferred that an inside diameter of the wall is at least 0.4 times the width of the wall. This parameter also contributes to homogeneous mixing of tablets of a tablet batch.

BRIEF DESCRIPTION OF THE DRAWINGS

Further features and advantages of the invention form the subject matter of the following description and of the graphical representation of preferred exemplary embodiments.

In the drawing.

DETAILED DESCRIPTION

Figure 1:
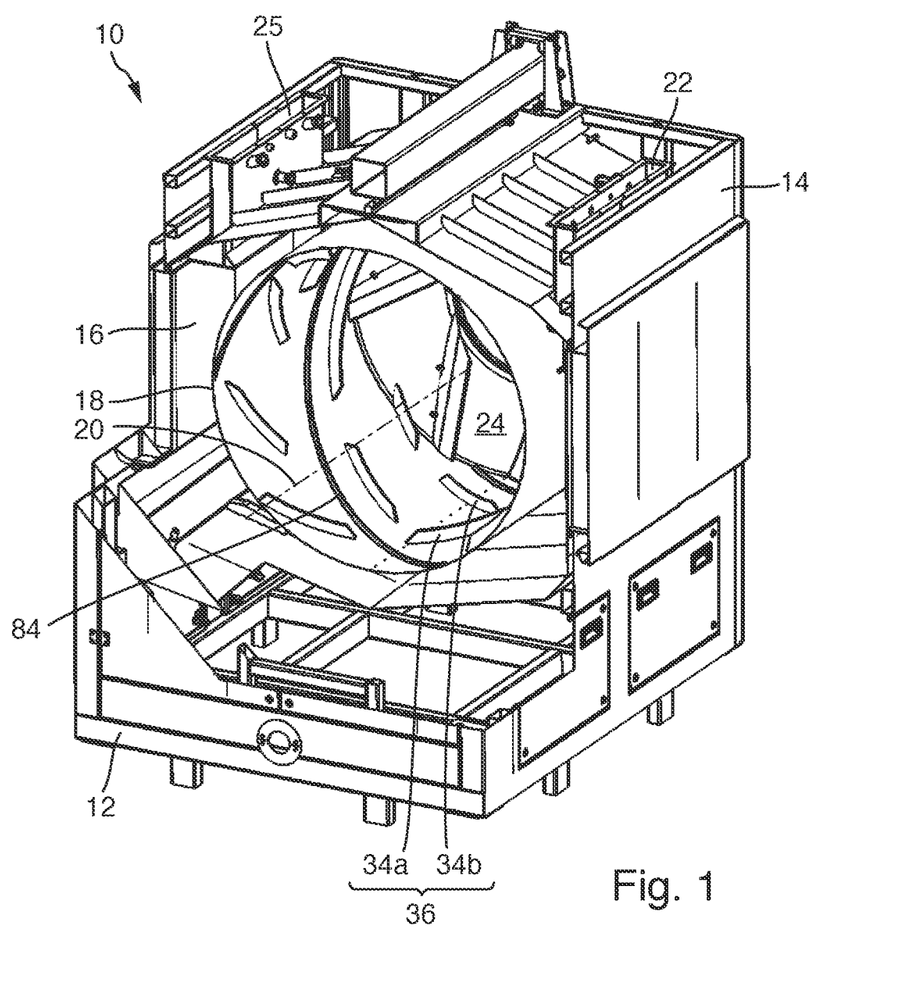
FIG. 1 shows a perspective, partially sectioned view of a drum coater device, with a mixing drum.

An embodiment of a drum coater device that is illustrated in FIG. 1 is designated overall by the reference sign 10. The device 10 comprises a frame 12 on which a housing 14 is arranged.

The housing 14 delimits a drum chamber 16 for arranging a mixing drum 18 which can be rotated about an axis of rotation 20. The axis of rotation 20 corresponds to the central axis of the mixing drum 18 and is oriented horizontally. For rotationally driving the mixing drum 18 there is provided a rotary drive which is known per se and which has therefore not been illustrated.

The device 10 comprises a supply-air connection 22 for feeding dry process air into the drum chamber 16, from which the process air passes into the interior 24 of the mixing drum 18.

Moist exhaust air passes from the interior 24 of the mixing drum 18 to an exhaust-air connection 25.

Figure 7:
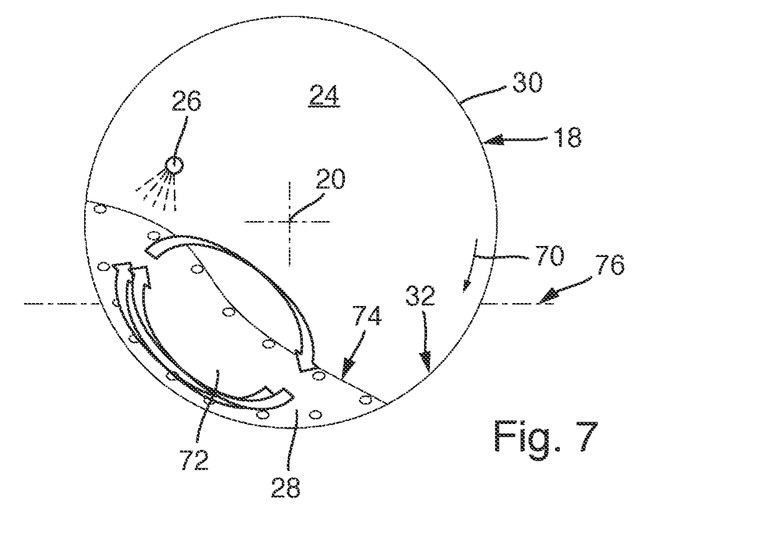
FIG. 7 shows a schematic front view of the mixing drum during an operation of the drum coater device.

The device 10 also comprises a spraying device which is schematically illustrated in FIG. 7 and arranged in the interior 24 of the mixing drum 18. The spraying device 26 comprises, for example, a spraying lance and serves for introducing a coating material for tablets of a tablet batch 28 arranged in the interior 24 of the mixing drum 18.

Figure 2:
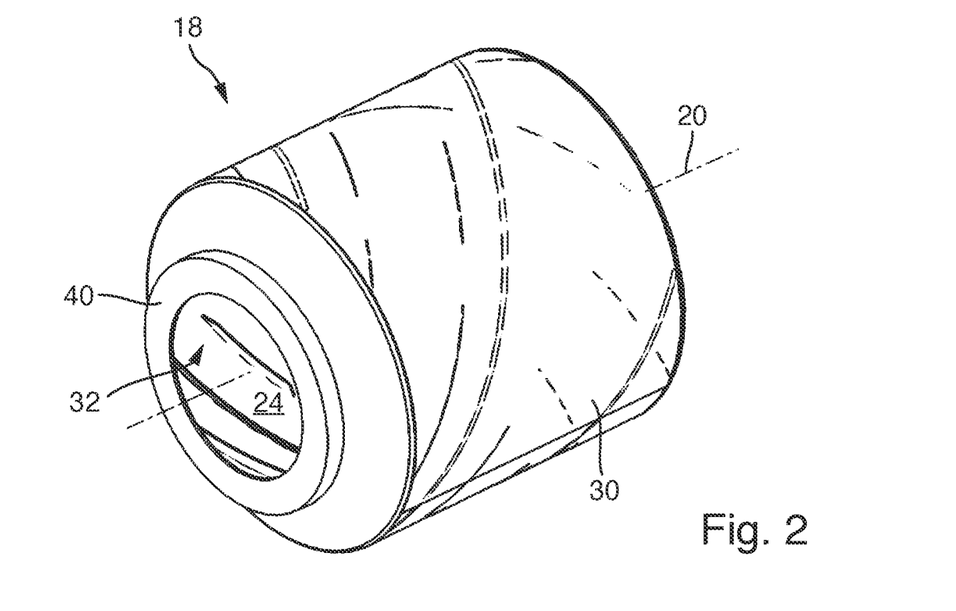
FIG. 2 shows a perspective view of the mixing drum.
Figure 3:
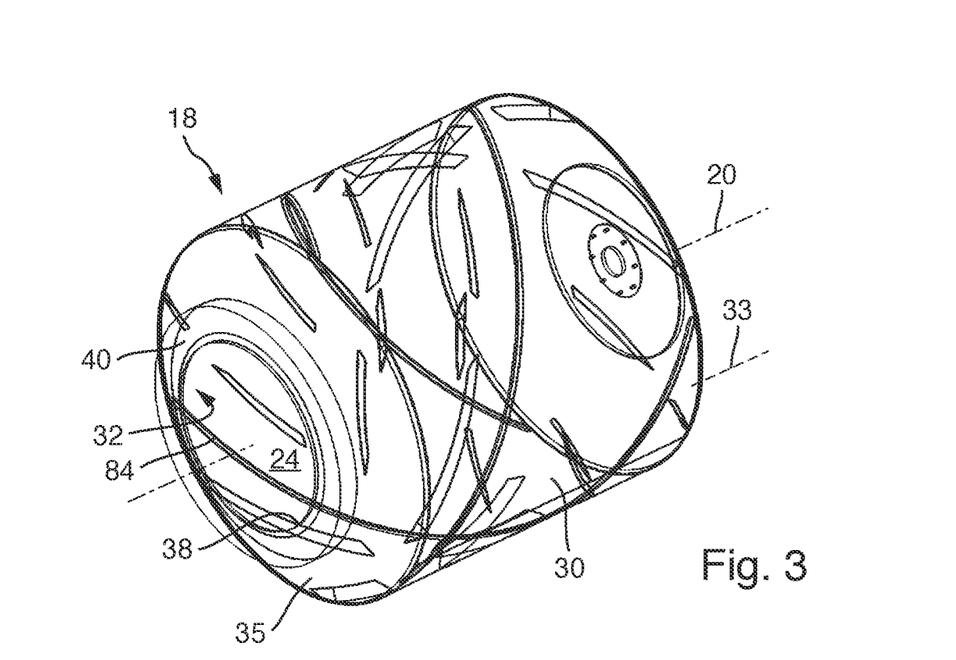
FIG. 3 shows a view corresponding to FIG. 2 in a partially transparent representation.

The construction of the mixing drum 18 will be described below with reference to FIGS. 2 to 4.

The mixing drum 18 has a hollow-cylindrical wall 30. The wall 30 has an inner side 32 facing the interior 24. The wall 30 is perforated so that dry process air can be introduced into the interior 24 and moist exhaust air can be removed.

The mixing drum 18 is delimited in the region of a rear side by a closed boundary surface 33. In the region of a front side, the mixing drum 18 is delimited by a boundary surface 35 which has a central opening 38 which can be closed and opened by means of a door 40.

The boundary surfaces 33 and 35 can have a frustoconical shape such that they frustoconically widen the interior 24 along the axis of rotation 20.

On the inner side 32 of the wall 30 are arranged mixing elements which each rise in the form of webs over the inner side 32 of the wall 30 and project from the inner side 32 in the direction of the axis of rotation 20.

Figure 4:
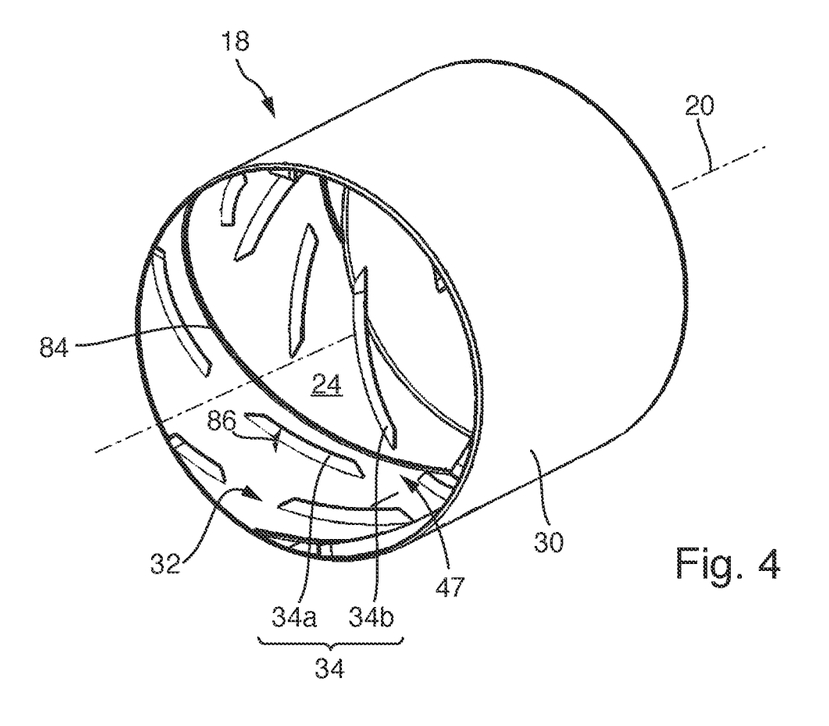
FIG. 4 shows a perspective view of a hollow-cylindrical part of the mixing drum.

In FIG. 4, two mixing elements are designated, by way of example, by the reference signs 34a and 34b. These mixing elements together form a pair 36 of mixing elements having legs which are oriented with respect to one another in a V shape.

Figure 5:
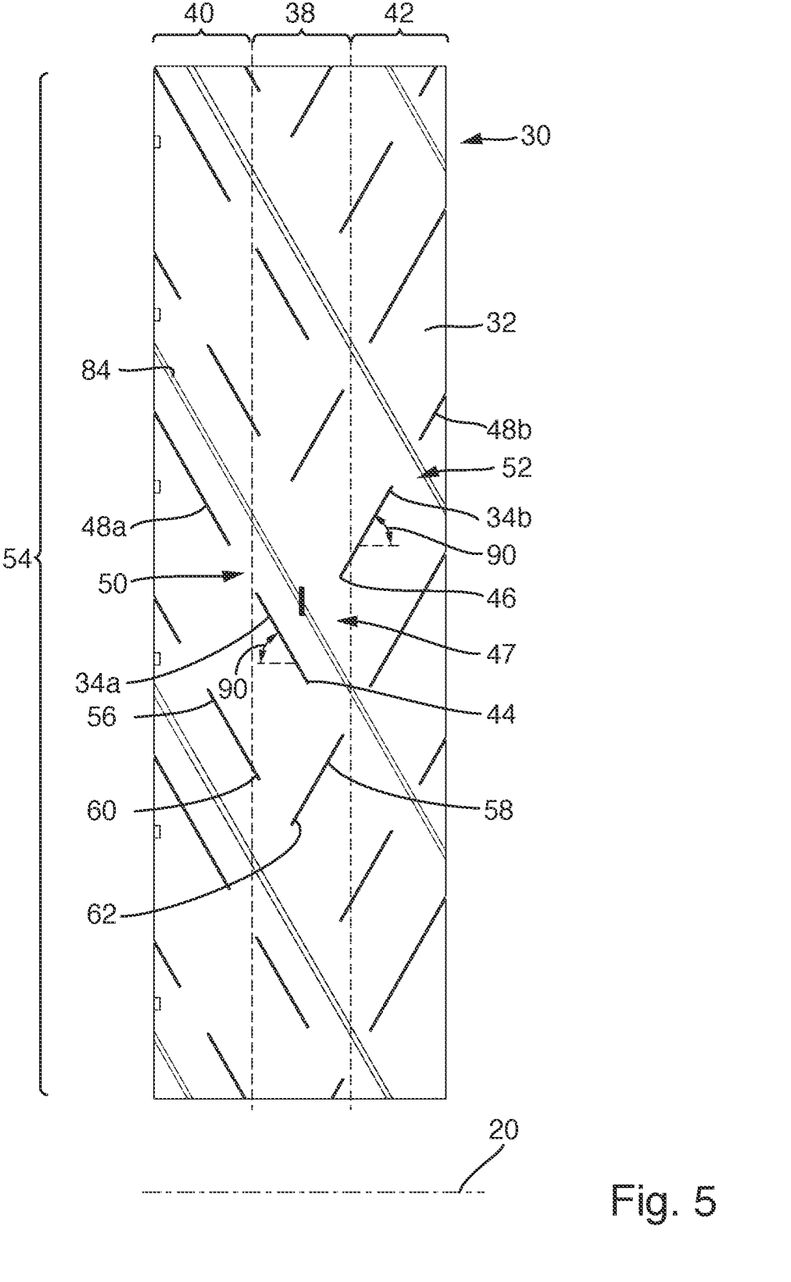
FIG. 5 shows a schematic representation of a developed view of the hollow-cylindrical part.

The two mixing elements 34a and 34b are also illustrated in the developed view of the inner side 32 of the wall 30 of the mixing drum 18, cf. FIG. 5. Also depicted there is the orientation of the axis of rotation 20. Perpendicular to the axis of rotation 20 and along the circumference 54 of the inner side 32 there extend three annular regions, namely a central annular region 38 and adjacent thereto in each case outer, lateral annular regions 40 and 42.

The two mixing elements 34a and 34b have mutually facing ends 44 or 46 which are spaced apart from one another in an intermediate space 47.

The two mixing elements 34a and 34b are each part of legs of a V-shaped arrangement. The legs of this arrangement are formed by further mixing elements 48a and 48b which each extend the V-shaped configuration of the two mixing elements 34a and 34b. As seen along a leg of this V-shaped arrangement, the mixing elements of one leg, for example the mixing elements 34a and 48a, are spaced apart from one another in a spacing region 50. The mixing elements 34b and 48b of the other leg of the same pair 36 are spaced apart from one another in a spacing region 52.

Following one another over the circumference 54 of the inner side 32 are arranged further pairs 36 of mixing elements which form an arrangement with V-shaped legs. Two mixing elements which form the legs of a further pair 36 are designated in FIG. 5, by way of example, by the reference signs 56 and 58.

The respectively mutually facing ends of the mixing elements 56 and 58 are designated by the reference signs 60 and 62. As seen in a direction parallel to the axis of rotation 20, the ends 44, 46, 60, 62 of different mixing elements 34a, 34b, 56, 58 are arranged so as to be offset from one another.

This results in an asymmetry which supports complete and homogeneous mixing of the tablets of a tablet batch 28.

Figure 6:
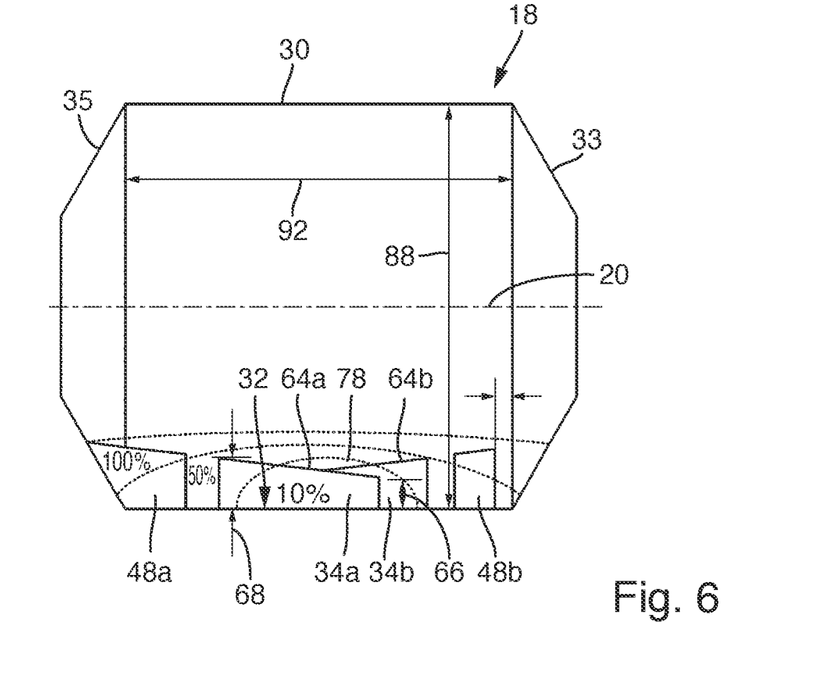
FIG. 6 shows a schematic side view of the mixing drum.

A subset of the mixing elements is illustrated in FIG. 6. The mixing elements 34a and 34b each have a mixing edge 64a and 64b which, in the central annular region (cf. FIG. 5), have a smaller distance 66 from the inner side 32 of the wall 30 than further laterally in the outer annular regions 40 and 42 (cf. FIG. 5), there having a greater distance 68 in comparison to the smaller distance 66.

During the mixing operation, the mixing drum 18 rotates about the axis of rotation 20, for example in the clockwise direction in a mixing direction of rotation 70, cf. FIG. 7. The rotation of the mixing drum 18 and the interaction of the mixing elements with the tablets of the tablet batch 28 of tablets lead to the formation of a tablet bed 72 which has a tablet level 74 which is inclined with respect to an imaginary horizontal 76.

Figure 9:
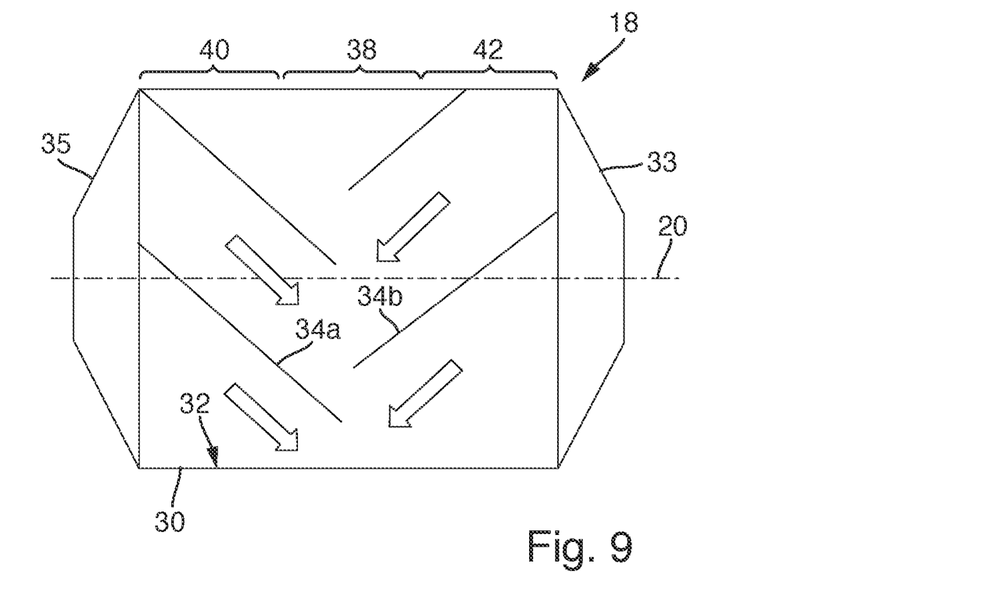

By virtue of the V-shaped arrangement of the mixing elements (for example the mixing elements 34a and 34b), an accumulation, which is designated in FIG. 6, by way of example, by the reference sign 78, is formed in the central annular region 38. During the rotation of the mixing drum 18, the tablets pass into the central annular region 38 on account of the V-shaped arrangement of the mixing elements 34a and 34b, cf. FIG. 9.

During the transport within an accumulation 78 (cf. FIGS. 6 and 7), the tablets of a lower tablet layer in the central annular region 38 are transported upwardly along the wall 30 (in FIG. 7 starting from about 6 o'clock to about 8 to 9 o'clock). There, these tablets of the lower tablet layer press the tablets of an upper tablet layer outwardly into the lateral annular regions 40, 42, cf. FIG. 8. The tablets of the upper tablet layer roll there and pass again into the central annular region 38, cf. FIG. 9, with these tablets of the previously upper tablet layer being conveyed downward and thus forming a new "lower tablet layer" which, along its further transport path, presses the previously lower tablet layer outwards such that the previously lower tablet layer then forms an upper tablet layer.

Figure 8:
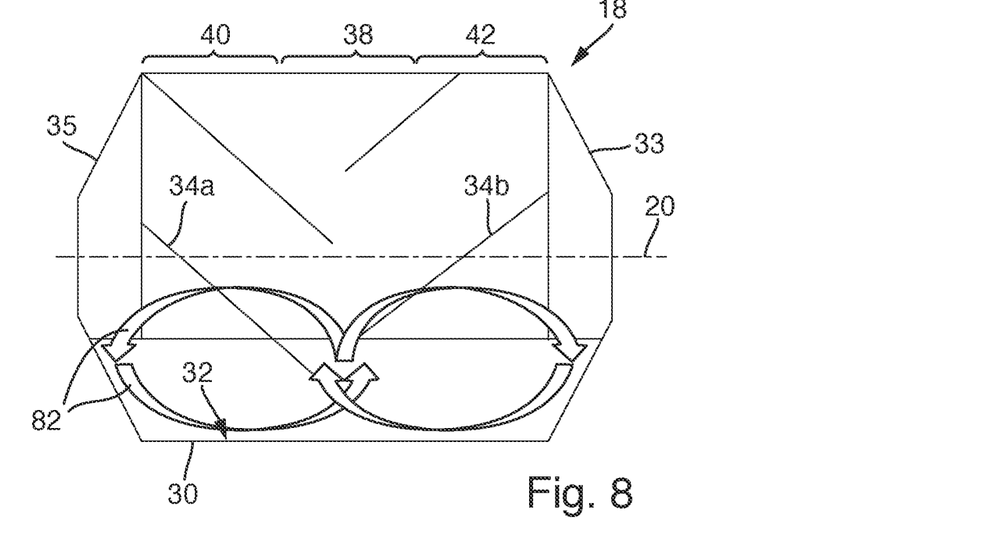
FIGS. 8 and 9 are views corresponding to FIG. 6 of the mixing drum during the operation of the drum coater device.

There are formed two spiral tablet transport paths overall, these being designated in FIG. 8 by the reference signs 80 and 82.

The above-explained mixing principle is independent of whether the tablet batch 28 is a small batch with a filling of, for example, 10% of the mixing drum 18, or else of whether the tablet batch 28 is larger, cf. for example illustrated filling degrees of 50% and 100% in FIG. 6. The higher the filling degree, the flatter (less pronouncedly curved) is the profile of the tablet bed 72 which is established.

For a final complete emptying of the mixing drum 18, it is advantageous that, for example, the mixing elements 34a, 34b of a pair 36 are spaced apart from one another in the intermediate space 47. This intermediate space 47 allows the arrangement of a bead-shaped elevation 84 which runs spirally along the inner side 32 of the wall 30, cf. FIGS. 1, 3, 4 and 5. Rotating the mixing drum 18 in an opposite direction of rotation to the mixing direction of rotation 70 allows remains of ready-coated tablets to be conveyed out of the interior 24 by means of the elevation 84 and removed via the opening 38 in the boundary surface 35. This removal operation can be supported by additional blades which are held available on the inner side of the boundary surface 35.

The mixing of the tablet batch 28 and the profile of the tablet transport paths 80, 82 can in particular also be influenced by the following parameters:

a setting angle 86 of a mixing element is between 60° and 90°, cf. FIG. 4, and/or the heights of the mixing elements 34a, 34b (these heights correspond to the distances 66, 68) are between 1% and 30% of an inside diameter 88 of the wall 30, cf. FIG. 6, and/or with respect to an axis parallel to the axis of rotation 20, the mixing elements 34a, 34b are arranged so as to be inclined by an angle 90 which is between 15° and 60°, cf. FIG. 5, and/or the inside diameter 88 of the wall 30 is at least 0.4 times a width 92 of the wall 30, cf. FIG. 6.

What is claimed is:

1. A drum coater device (10) for coating tablets, comprising a mixing drum (18) which can be rotated about an axis of rotation (20) and which has an interior (24) for arranging a tablet batch (28) to be coated, further comprising a spraying device (26) for introducing a coating material into the interior (24), wherein the mixing drum (18) has a hollow-cylindrical, perforated wall (30) which delimits at least part of the interior (24) of the mixing drum (18), wherein mixing elements for mixing the tablets of a tablet batch (28) are arranged on an inner side (32), which faces the interior (24), of the wall (30), wherein pairs (36) of mixing elements (34a, 34b) form legs which are oriented with respect to one another in a V shape, wherein a distance between the legs of a pair (36) widens from a central annular region (38), as seen along the axis of rotation (20), of the wall (30) in a direction of lateral annular regions (40, 42) adjacent to the central annular region (38)

wherein one leg of at least one pair (36) defines a leg axis, the one leg being fragmented to have at least two mixing elements (34a, 48a) that are spaced apart from one another and aligned along the leg axis.

2. The drum coater device (10) according to claim 1, wherein ends (44, 46), which are arranged in the central annular region (38), of the legs of at least one pair (36) are spaced apart from one another.

3. The drum coater device (10) according to claim 1, wherein both legs of the at least one pair (36) are fragmented and each leg defines a respective leg axis, and wherein each leg has at least two mixing elements (34a, 48a) that are spaced apart from one another and aligned along the respective leg axis.

4. The drum coater device (10) according to claim 1, wherein the mixing elements (34a, 34b) or a subset of mixing elements of the at least one pair (36) each have a mixing edge (64a, 64b) which faces the axis of rotation (20) and which is inclined relative to the wall.

5. The drum coater device (10) according to claim 4, wherein the mixing edge (64a, 64b)—as seen from the central annular region (38) in the direction of a lateral annular region (40, 42)—has, along its extent, an increasingly greater distance (66) from the wall (30).

6. The drum coater device (10) according to claim 1, wherein a fraction of at least 10% and/or at most 75% of a circumference (54) of the inner side (32) of the wall (30) is covered by the mixing elements (34a, 34b).

7. The drum coater device (10) according to claim 1, wherein the mixing elements (34a, 34b) have a setting angle (86) relative to the inner side (32) of the wall (30) that is between 60° and 90°.

8. The drum coater device (10) according to claim 1, wherein the mixing elements (34a, 34b) have a height which is between 1% and 30% of an inside diameter (88) of the wall (30).

9. The drum coater device (10) according to claim 1, wherein, with respect to an axis parallel to the axis of rotation (20), the mixing elements (34*a*, 34*b*) are arranged so as to be inclined by an angle (90) which is between 15° and 60°.

10. The drum coater device (10) according to claim 1, wherein the inside diameter (88) of the wall (30) is at least 0.4 times the width (92) of the wall (30).

\* \* \* \* \*